United States Patent [19]
Drake

[11] 3,880,928
[45] Apr. 29, 1975

[54] CATALYTIC HYDROGENATION OF UNSATURATED DINITRILES EMPLOYING RHODIUM AS CATALYTIC AGENT

[75] Inventor: Charles A. Drake, Bartlesville, Okla.

[73] Assignee: Phillips Petroleum Company, Bartlesville, Okla.

[22] Filed: Nov. 19, 1973

[21] Appl. No.: 416,787

[52] U.S. Cl............................ 260/583 P; 260/583 K
[51] Int. Cl.............................................. C07c 87/14
[58] Field of Search...................... 260/583 K, 583 P

[56] References Cited
UNITED STATES PATENTS

| | | | |
|---|---|---|---|
| 2,504,024 | 4/1950 | Howk et al. | 260/583 K |
| 3,117,162 | 1/1964 | Rylander et al. | 260/583 K |
| 3,372,195 | 3/1968 | Little | 260/583 K X |
| 3,408,397 | 10/1968 | Feldman et al. | 260/583 K |
| 3,471,563 | 10/1969 | Brake | 260/583 K |
| 3,488,390 | 1/1970 | Carss et al. | 260/583 K |

*Primary Examiner*—Joseph P. Brust

[57] ABSTRACT

The one-step catalytic hydrogenation of an unsaturated dinitrile reactant of the formula

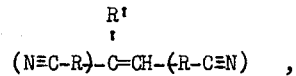

wherein each R is an alkylene or an alkylidene radical, and each R' is an alkyl radical, is carried out in the presence of $NH_3$; hydrogen; a diluent selected from the group consisting of aliphatic alcohols having 2 to 12 carbon atoms, alkanes and cycloalkanes having from 4 to 12 carbon atoms, and unsubstituted acyclic and unsubstituted cyclic ethers having from 4 to 12 carbon atoms; and a catalyst selected from elemental rhodium, rhodium compounds which are reducible by hydrogen to elemental rhodium, and mixtures thereof.

15 Claims, No Drawings

CATALYTIC HYDROGENATION OF UNSATURATED DINITRILES EMPLOYING RHODIUM AS CATALYTIC AGENT

This invention relates to a process for the preparation of saturated aliphatic diamines by the catalytic hydrogenation of unsaturated aliphatic dinitriles.

In general, various processes for the catalytic hydrogenation of unsaturated aliphatic dinitriles to saturated aliphatic diamines are known to the art. Group VIII metal catalysts such as cobalt, nickel, ruthenium, rhodium, or palladium have been employed as effective catalysts for the hydrogenation of various feedstocks in these processes. However, it has been discovered that many of these hydrogenation catalyst materials are not efficient or effective for the hydrogenation of unsaturated aliphatic dinitriles having the formula

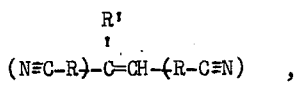

wherein each R is an alkylene or an alkylidene radical, and each R' is an alkyl radical.

In accordance with this invention, these branched-chain unsaturated aliphatic dinitriles can be efficiently reduced to branched-chain saturated aliphatic diamines by the use of a catalyst selected from the group consisting of rhodium, rhodium compounds which are reducible by hydrogen to the elemental form of rhodium, and mixtures thereof, in the presence of ammonia, hydrogen, and at least one diluent selected from the group consisting of aliphatic alcohols having from 2 to 12 carbon atoms, alkanes and cycloalkanes having from 4 to 12 carbon atoms, and unsubstituted acyclic and unsubstituted cyclic ethers having from 4 to 12 carbon atoms.

It is an object of this invention to provide a process for the catalytic hydrogenation of branched-chain unsaturated aliphatic dinitriles to branched-chain saturated aliphatic diamines. Another object is to provide an efficient one-step process for the catalytic hydrogenation of an unsaturated dinitrile having the formula

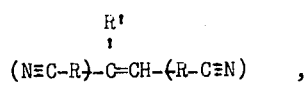

wherein each R is an alkylene or an alkylidene radical, and each R' is an alkyl radical. Still another object is to provide an efficient process for the catalytic hydrogenation of a mixture of branched-chain unsaturated aliphatic dinitriles to produce saturated aliphatic diamines. Still another object is to provide an efficient process for the catalytic hydrogenation of branched-chain unsaturated aliphatic dinitriles under reaction conditions which limit the occurrence of byproduct reactions which promote the formation of secondary or tertiary amines. Other objects, aspects and advantages of the invention will be apparent from a study of the specification and the appended claims.

The branched-chain unsaturated aliphatic dinitriles which are considered to be advantageously and efficiently hydrogenated in accordance with the process of this invention are the unsaturated dinitriles of the formula:

(I) 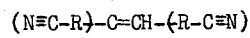

wherein each R is independently selected from the group consisting of an alkylene radical and an alkylidene radical, and R' is an alkyl radical. Each R will generally have from 1 to 15 carbon atoms, preferably from 1 to 6, and more preferably from 1 to 3 carbon atoms. R' will generally have from 1 to 15 carbon atoms, preferably from 1 to 6 carbon atoms, and more preferably from 1 to 3 carbon atoms. In general, the unsaturated dinitrile reactant of Formula (I) will contain from 7 to 30 carbon atoms, preferably from 8 to 16 carbon atoms, and more preferably from 9 to 12 carbon atoms.

Representative of unsaturated reactant species of Formula (I) include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 1-2-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-3-dodecenedinitrile, 2,4,7,9,11,1-3,15-heptaethyl-6-hexadecenedinitrile, and mixtures thereof.

If desired, other unsaturated dinitrile reactants can be present and effectively hydrogenated during the hydrogenation of the unsaturated dinitriles of Formula (I). Thus, in addition to the unsaturated dinitrile reactants of Formula (I), the dinitrile feedstock can contain one or more unsaturated dinitrile reactants of the formula:

(II) 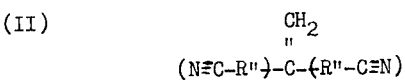

wherein each R'' is independently selected from the group consisting of an alkylene radical and an alkylidene radical. In general, each R'' will have from 1 to 15 carbon atoms, preferably from 1 to 7 carbon atoms, and more preferably from 1 to 4 carbon atoms. The dinitriles of formula (II) will generally contain from 6 to 30 carbon atoms, preferably from 8 to 16 carbon atoms, and more preferably from 9 to 12 carbon atoms. Representative unsaturated dinitrile reactants of formula (II) include such compounds as 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylenedodecanedinitrile, 2,26-dimethyl-14-methyleneheptacosanedinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present as long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles. The significant advantages of the invention increase with increasing concentrations of the dinitriles of formula (I) in the feedstock. Thus, the process of the invention is even more advantageous for concentrations of the dinitriles of formula (I) in the feedstock of at least 5 weight percent. The invention is considered to be particularly desirable for dinitrile feedstock having a concentration of the dinitriles of formula (I) of at least 10 weight percent.

A presently preferred branched-chain unsaturated aliphatic dinitrile feedstock for employment in the practice of this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. The first four named compounds in this mixture are of the type of formula (I), while the last three named compounds in this mixture are of the type of formula (II). The weight ratio of the dinitriles of formula (I) to the dinitriles of formula (II) in this mixture is generally in the range of about 10:1 to about 1:10.

In the practice of this invention, the catalytic hydrogenation of the unsaturated dinitrile reactant of formula (I) results primarily in the formation of unsaturated diamine reaction products having the formula:

(III)

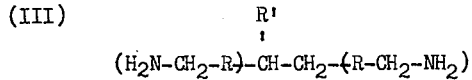

wherein R and R' are as defined hereinbefore. The catalytic hydrogenation of the unsaturated dinitrile reactant of formula (II) results primarily in the formulation of saturated diamine reaction products having the formula:

(IV)

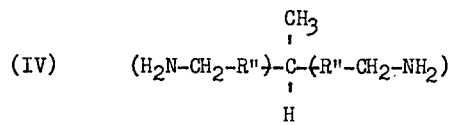

wherein R'' is as defined hereinbefore.

The practice of this invention is particularly suited to the catalytic hydrogenation of this mixture of species of formula (I) and formula (II) for the purpose of achieving saturated diamine reaction products which are substantially free of any olefinic unsaturation and preferably essentially free of any olefinic unsaturation. The phase "substantially free of olefinic unsaturation" signifies that the diamine reaction products contain less than about 1 weight percent unsaturated diamine reaction product based on the total weight of unsaturated and saturated diamine reaction products wherein the weight percents are determined by conventional GLC analysis. The phrase "essentially free of olefinic unsaturation" signifies that the diamine reaction products contain less than about 0.1 weight percent unsaturated diamine reaction product based on the total weight of unsaturated and saturated diamine reaction products wherein the weight percents are determined by conventional GLC analysis techniques. These diamine reaction products which are at least substantially free, and preferably essentially free, of olefinic unsaturation are advantageously employed in the preparation of linear terephthalamide polymers.

One of the most important advantages of the catalytic hydrogenation process of this invention is directly related to the production of a mixture of diamines which are essentially free of olefinic unsaturation from the unsaturated dinitrile product mixture produced by the reaction of acrylonitrile and isobutylene. This advantage is significant since prior art catalytic hydrogenation of the acrylonitrile and isobutylene reaction product mixture failed to substantially or completely reduce the olefinic unsaturation of the unsaturated dinitrile feedstock, thereby producing a reaction product mixture containing branched-chain aliphatic diamines having substantial olefinic unsaturation in the carbon skeleton. The separation of the branched-chain olefinically unsaturated diamines from the saturated diamines is inconvenient, and polyamides prepared from the mixtures containing a significant amount of unsaturated diamines have been found to be unsuited or undesirable in the preparation of polyamide fibers, particularly the terephthalamide polymers. Thus, the catalytic hydrogenation of this invention is a significant advance in the preparation of such polyamides.

The catalysts that are considered to be suitable for employment in the catalytic hydrogenation process of this invention include finely divided elemental rhodium, compounds of rhodium which are reducible by hydrogen to finely divided elemental rhodium, and mixtures thereof. Suitable reducible compounds include the oxides, halides, nitrates, sulfates, oxalates, acetates, carbamates, propionates, tartrates, hydroxides, and the like, and mixtures thereof. Specific examples include rhodium carbonate, rhodium oxide, rhodium chloride, rhodium nitrate, rhodium oxalate, rhodium acetate, and rhodium hydroxide, and the like. The weight ratio of catalyst to unsaturated dinitrile reactant, based on the weight of the total of rhodium contained therein, can be varied as desired. For the purpose of maintaining reasonable reaction rates under economically attractive catalyst reaction kinetics, it is generally preferred that the weight ratio of rhodium to the unsaturated dinitrile reactants be maintained within a range of about 0.01:100 to about 30:100, and preferably in the range of about 0.1:100 to about 20:100.

In the practice of this invention, it is often desirable to employ catalytic amounts of elemental rhodium, reducible compounds of rhodium, or mixtures thereof supported by a solid catalyst carrier which does not deleteriously affect the catalytic hydrogenation process of this invention. Such supports include, for example, carbon, kieselguhr, silica, alumina, silica-alumina, calcium carbonate, barium carbonate, asbestos, pumice, clays, and the like, and mixtures thereof. The rhodium catalyst can be added to the catalyst support by any of the methods well known in the art. For example, the supported catalysts can be prepared by dry mixing the components or by impregnating the support with a solution or dispersion of rhodium in elemental form or in the form of reducible compounds thereof. The supported catalyst can be pretreated with hydrogen to reduce the compounds, or such reduction can be achieved in the hydrogenation reactor. When a support is employed, the elemental rhodium content will generally be in the range of about 0.5 to about 50 weight percent, preferably in the range of about 1 to about 10 weight percent, based on the weight of the total catalyst components. A presently preferred catalyst is rhodium on alumina, having a rhodium metal content of about 5 percent by weight, based on the total weight of the catalyst and the support material. This presently preferred catalytic form, as well as other suitable catalysts such as 5 weight percent rhodium on charcoal, are commercially available.

Any catalytic hydrogenation temperature can be employed which provides the desired degree of catalytic efficiency in the hydrogenation of the branched-chain unsaturated aliphatic dinitrile containing feedstock. The hydrogenation temperatures will generally be within the range of about 30° C. to about 150° C. The more effective catalytic hydrogenation temperatures are considered to be within the range of about 70° C. to about 120° C.

The catalytic hydrogenation of branched-chain unsaturated aliphatic dinitriles can be carried out at any hydrogen pressure wherein both the olefinic unsaturation and the nitrile groups are reduced in the presence of ammonia, hydrogen and a suitable diluent. Generally, suitable hydrogen pressures are within the range of from about 500 to about 5,000 psig, but lower or even higher hydrogen pressures can be employed. Preferably, due to economic considerations, hydrogen pressures within the range of about 1,000 to about 3,000 psig are employed.

Any time interval suited for the catalytic hydrogenation of branched-chain unsaturated aliphatic dinitriles can be employed in the practice of this invention. However, time intervals economically attractive to the process are generally within the range of about 15 minutes to about 5 hours for a batch hydrogenation process. A reaction time in the range of about 1 to about 3 hours is presently preferred in order to insure substantially complete hydrogenation of any unsaturated olefinic bonds in the feedstock as well as complete hydrogenation of the nitrile groups to primary amino groups. The catalytic hydrogenation of unsaturated dinitriles in accordance with the process of this invention can be carried out as a continuous process at any suitable liquid hourly space velocity (LHSV). However, the liquid hourly space velocity rates will generally be within the range of about 0.1 to about 10, more preferably from about 0.5 to about 2, volumes of unsaturated dinitrile reactant plus diluent per volume of catalyst (including the volume of any catalyst support if any is present).

The diluent is selected from the class consisting of saturated aliphatic alcohols containing from 2 to 12 carbon atoms per molecule, alkanes and cycloalkanes having from 4 to 12 carbon atoms, and unsubstituted acyclic and unsubstituted cylic ethers having from 4 to 12 carbon atoms, and mixtures thereof. The term "unsubstituted" signifies that there are no substituents other than hydrocarbyl radicals. Examples of alcohol diluents include ethanol, 2-propanol, 2-methyl-2-propanol, 2-methyl-2-butanol, 2-ethyl-2-hexanol, 2-butanol, 1-hexanol, 1-octanol, 2-decanol, 1-dodecanol, and the like, and mixtures thereof. The foregoing examples of saturated aliphatic alcohols are unsubstituted alkanols containing from 2 to 12 carbon atoms per molecule. Examples of alkanes and cycloalkanes include butane, pentane, hexane, decane, dodecane, cyclobutane, cyclopentane, cyclohexane, cyclodecane, cyclododecane, 2-methylbutane, methylcyclopentane, 2,2,4-trimethylpentane and mixtures thereof. Examples of ethers include 1,3-dioxane, 1,4-dioxane, tetrahydrofuran, 4,4-dimethyl-1,3-dioxane, and mixtures thereof. Presently preferred diluents are 2-methyl-2-propanol, 2-methyl-2-butanol, n-hexane, cyclohexane, and 1,4-dioxane. To facilitate handling of the reaction mixtures, the weight ratio of unsaturated dinitrile reactants to diluent charged to the reaction zone is generally within the weight ratio range of about 0.001:100 to about 15:100, and is preferably in the range of about 0.1:100 to about 12:100.

Ammonia is employed in the process of this invention as a means of suppressing undesirable side reactions such as the formation of secondary and tertiary amines. Any amount of ammonia can be employed which is effective in deterring or reducing undesirable side reactions. In general, the mol ratio of ammonia to cyano group (there being two cyano groups in each unsaturated dinitrile) will be in the range of about 1:1 to about 25:1, and preferably will be in the range of about 7:1 to about 15:1.

Recovery of the desired end product, the branched-chain saturated aliphatic diamines, including preferred branched-chain saturated aliphatic diamine reaction products which contain less than about 0.1 percent unsaturated diamine by weight of the total reaction product as determined by GLC, as well as any resulting reaction byproducts, any unconsumed reactants, ammonia, hydrogen, and/or diluents can be carried out by any conventional separation means. In general, at the conclusion of the catalytic hydrogenation process, the reaction zone effluent is cooled and depressurized with the recovery, if desired, of any ammonia or diluent which is vented from the reaction zone effluent during the depressurization operation. The ammonia or diluent can be returned or recycled to the hydrogenation zone if desired. The reaction products can be separated from the catalyst by conventional filtration means. The filtrate containing the at least substantially completely saturated diamines can be conveniently separated from any reaction byproducts or any diluent remaining in the filtrate by any conventional fractional distillation.

The following examples are presented in further illustration of the invention.

EXAMPLE I

A one liter autoclave was charged with 30 g (0.185 mol) of the purified reaction product of two mols of acrylonitrile with one mol of isobutylene. This reaction product consisted essentially of a mixture of isomeric unsaturated dinitriles having one carbon-carbon double bond and 10 carbon atoms per molecule. The principle isomers were 5-methylenenonanedinitrile and 5-methyl-4-nonenedinitrile with very small amounts of more highly branched isomers such as 2-methyl-4-methylene-octanedinitrile, among others. For simplicity, the above-described reaction product will hereafter be called diadduct (DA). Also charged to the one liter autoclave was 350 ml (276 g) of ethanol and 4 g of a rhodium on alumina catalyst (5 weight percent rhodium, based on the total catalyst composition). The system was flushed with nitrogen and then charged with 80 g (4.7 mol) of ammonia. The reactor was then pressured with hydrogen to 1,390 psig and the mixture stirred throughout the reaction period of about 2.5 hours. During the first hour the temperature was 28° C. but thereafter increased to a final temperature of 105° C. The reactor was cooled, vented and the contents filtered to remove the catalyst. The filtrate was distilled under vacuum to provide 27.0 g (84.6 percent yield) of the saturated diamines and a 12.5 percent by weight yield (4.0 g) of heavies as distillation residue. A combination of gas-liquid chromatograph (GLC) analysis and nuclear magnetic resonance (NMR) analysis of the product demonstrated that the reduction of the unsaturated dinitriles was complete.

EXAMPLE II

A one liter autoclave was charged with 250 ml (202 g) of n-butyl alcohol, 20 g of the diadduct described in Example I, and 2 g of rhodium on alumina (5 weight percent rhodium, based on the total catalyst composition). The system was flushed with nitrogen, and then 40 g (2.35 mol) of ammonia was added. The reactor was then pressured to 1500 psig with hydrogen, and heated to 100° C. for one hour. The reaction effluent was filtered, concentrated by rotary evaporator, and analyzed by GLC. The analysis indicated complete reduction of the unsaturated dinitriles.

EXAMPLE III

As a control run, a one liter autoclave was charged with 5 g of 5 weight percent palladium on alumina, 30 g (0.185 mol) of the diadduct previously described in Example I and 350 ml (276 g) ethanol. The reactor was flushed with nitrogen, charged with 60 g (3.53 mols) of ammonia and pressured to 1,500 psig with hydrogen. The reaction mixture was heated at 100° C. for 1 hour but no hydrogen uptake was observed. The reaction mixture was then heated at 130° C. and finally at 160° C. with also no apparent uptake of hydrogen. The reactor was cooled, vented and the contents filtered. Analysis of the reaction product indicated that the starting material was recovered essentially unchanged.

EXAMPLE IV

As a control run, the one liter autoclave was charged with 350 ml (277 g) of methanol, 5 g of palladium on carbon (5 weight percent palladium, based on total catalyst composition) and 20 g (0.123 mol) of the diadduct previously described in Example I. The system was flushed with nitrogen and charged with 40 g (2.35 mol) ammonia, pressured to 1,400 psig with hydrogen and heated to 170° C. for a two-hour reaction period. The autoclave was then cooled, vented, and the contents filtered. The filtrate was concentrated by evaporating essentially all of the diluent under vacuum. Analysis of the product residue from the concentration step by GLC showed that essentially no diamines were produced and that the major amount of recovered material was unreacted starting compound (diadduct). This run indicates the surprising reactivity of the catalysts of the invention compared to a control catalyst.

EXAMPLE V

A run employing Raney cobalt was made as a control run. In this run, the one liter autoclave was charged with 300 ml (237 g) methanol, 30 g (0.185) of the diadduct, described in Example I, and 10 g of the Raney cobalt catalyst. The system was flushed with nitrogen, charged with 60 g (3.53 mol) of ammonia and pressured to 1,500 psig with hydrogen. The reaction mixture was heated from 58° C. to 190° C. in the first hour then maintained at 190° C. for the last two hours of the three-hour reaction period. The reactor was cooled, vented, and the contents filtered. The filtrate was analyzed by GLC from which it was estimated that about 50 weight percent of the product was saturated diamines while unsaturated diamines accounted for about 30 weight percent and heavies accounted for 20 weight percent of the product. This run demonstrated that a catalyst of the prior art was not entirely effective under the conditions employed for producing a saturated diamine from the unsaturated dinitrile.

EXAMPLE VI

A run was carried out under essentially the same conditions as those employed in Example V except that 10 g of Raney nickel was employed as the catalyst. Analysis of the product mixture of GLC showed that about 65 weight percent was the saturated diamine, about 10 weight percent was unsaturated diamine, and about 20 weight percent was heavy residue (heavies).

The foregoing examples illustrate that rhodium is an efficient and effective catalytic agent for the hydrogenation of branched-chain unsaturated aliphatic dinitriles of the structure of formulas (I) and (II) whereas prior art catalysts such as palladium, cobalt, and nickel are not efficient or effective in substantially completely hydrogenating the olefinic unsaturation and the nitrile groups of branched-chain unsaturated aliphatic dinitriles of the structure of formula (I).

Reasonable variations and modifications are possible within the scope of the foregoing disclosure and the appended claims to the invention.

What is claimed is:

1. A process for the catalytic hydrogenation of an unsaturated dinitrile feedstock containing at least one unsaturated dinitrile compound of the formula:

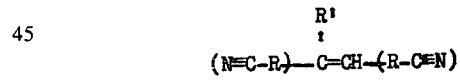

wherein each R is independently selected from the group consisting of an alkylene radical and an alkylidene radical, R' is an alkyl radical, and the number of carbon atoms in said compound is in the range of 7 to 30; which comprises contacting said feedstock under suitable hydrogenation conditions with ammonia; hydrogen; at least one diluent selected from the group consisting of unsubstituted alkanols having from 2 to 12 carbon atoms, alkanes and cycloalkanes having from 4 to 12 carbon atoms, and unsubstituted acyclic and unsubstituted cyclic ethers having from 4 to 12 carbon atoms; and the catalyst consisting essentially of a catalytic component selected from the group consisting of elemental rhodium, rhodium compounds which are reducible by hydrogen to elemental rhodium under said hydrogenation conditions, and mixtures thereof, to thereby effect the at least substantially complete hydrogenation of said at least one unsaturated dinitrile compound to the corresponding branched-chain saturated aliphatic diamine.

2. A process in accordance with claim 1 wherein said suitable hydrogenation conditions comprise a weight ratio of rhodium present to the unsaturated dinitriles in the range of about 0.01:100 to about 30:100, a mol ratio of ammonia to cyano groups in the range of about 1:1 to about 25:1, a hydrogen pressure in the range of about 500 to about 5,000 psig, a weight ratio of the unsaturated dinitriles to the diluent in the range of about 0.001:100 to about 15:100, a temperature within the range of about 30°C to about 150°C, and a reaction time in the range of about 15 minutes to about 5 hours for a batch process and a liquid hourly space velocity in the range of about 0.1 to about 10 volumes of unsaturated dinitrile reactant plus diluent per volume of catalyst for a continuous process.

3. A process in accordance with claim 1 wherein said catalyst together with a solid catalyst support forms a catalyst composition, the content of the elemental rhodium being in the range of about 0.5 to about 50 weight percent of said catalyst composition.

4. A process in accordance with claim 1 wherein each of said alkylene radical, said alkylidene radical and said alkyl radical has from 1 to 15 carbon atoms.

5. A process in accordance with claim 1 wherein said at least one unsaturated dinitrile compound comprises a mixture of 5-methyl-b 4-nonenedinitrile, 2,4dimethyl-4-octenedinitrile, 2,4-dimethyl-3-octenedinitrile, and 2,4,6-trimethyl-3-heptenedinitrile.

6. A process in accordance with claim 1 further comprising recovering a diamine product containing less than about 1 weight percent unsaturated diamines.

7. A process in accordance with claim 1 further comprising recovering a diamine product essentially free of unsaturation.

8. A process in accordance with claim 1, wherein said feedstock further comprises at least one unsaturated dinitrile reactant of the formula:

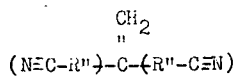

wherein each R'' is independently selected from the group consisting of an alkylene radical and an alkylidene radical, and the number of carbon atoms in said reactant is in the range of 7 to 30.

9. A process in accordance with claim 8 wherein said suitable hydrogenation conditions comprise a weight ratio of rhodium present to the unsaturated dinitriles in the range of about 0.1:100 to about 20:100, a mol ratio of ammonia to cyano groups in the range of about 7:1 to about 15:1, a hydrogen pressure in the range of about 1,000 to about 3,000 psig, a weight ratio of the unsaturated dinitriles to the diluent in the range of about 0.1:100 to about 12:100, and a temperature in the range of about 70°C. to about 120°C; said at least one unsaturated dinitrile compound constituting at least 5 weight percent of the unsaturated dinitriles in said feedstock; wherein said at least one unsaturated dinitrile compound is converted primarily to a saturated diamine having the formula:

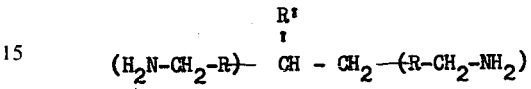

wherein R and R' are as defined hereinbefore; wherein said at least one unsaturated dinitrile reactant is converted primarily to a saturated diamine having the formula:

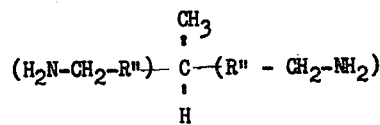

wherein R'' is as defined hereinbefore; and recovering a diamine product containing less than about 1 weight percent unsaturated diamines.

10. A process in accordance with claim 9 wherein the recovered diamine product is essentially free of unsaturation.

11. A process in accordance with claim 9 wherein each R and R' has from 1 to 6 carbon atoms, and wherein each R'' has from 1 to 7 carbon atoms.

12. A process in accordance with claim 9 wherein said diluent is at least one of said unsubstituted alkanols.

13. A process in accordance with claim 9 wherein said diluent is at least one of said alkanes and cycloalkanes.

14. A process in accordance with claim 9 wherein said diluent is at least one of said ethers.

15. A process in accordance with claim 9 wherein said feedstock comprises 5-methylene-nonanedinitrile and 5-methyl-4-nonenedinitrile.

* * * * *